(12) United States Patent
Yousefzadeh et al.

(10) Patent No.: US 12,288,109 B2
(45) Date of Patent: *Apr. 29, 2025

(54) MESSAGE-BASED PROCESSING SYSTEM WITH ADDRESS COMPUTATION MODES

(71) Applicant: Snap Inc., Santa Monica, CA (US)

(72) Inventors: Amirreza Yousefzadeh, Eindhoven (NL); Arash Pourtaherian, Waalre (NL); Peng Qiao, Eindhoven (NL); Orlando Miguel Pires dos Reis Moreira, Eindhoven (NL); Luc Johannes Wilhelmus Waeijen, Haelen (NL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,003

(22) Filed: Mar. 12, 2024

(65) Prior Publication Data

US 2024/0248775 A1    Jul. 25, 2024

Related U.S. Application Data

(63) Continuation of application No. 17/787,203, filed as application No. PCT/EP2020/087159 on Dec. 18, 2020, now Pat. No. 11,960,946.

(30) Foreign Application Priority Data

Dec. 20, 2019 (EP) .................................. 19219021

(51) Int. Cl.
  *G06F 9/54* (2006.01)
(52) U.S. Cl.
  CPC ............. *G06F 9/546* (2013.01); *G06F 9/542* (2013.01)

(58) Field of Classification Search
None
See application file for complete search history.

(56) References Cited

U.S. PATENT DOCUMENTS 6,195,737 B1 * 2/2001 Hollister ............. G06F 12/0207
                                                          711/E12.003
9,519,947 B2   12/2016 Nickolls et al.
(Continued)

FOREIGN PATENT DOCUMENTS

| EP | 3839740 A1 | 6/2021 |
|---|---|---|
| EP | 4078371 A1 | 10/2022 |
| WO | WO-2021123260 A1 | 6/2021 |

OTHER PUBLICATIONS

"U.S. Appl. No. 17/787,203, Non Final Office Action mailed Aug. 17, 2023", 12 pgs.
"U.S. Appl. No. 17/787,203, Notice of Allowance mailed Dec. 12, 2023", 15 pgs.
"U.S. Appl. No. 17/787,203, Preliminary Amendment filed Jun. 17, 2022", 9 pgs.

(Continued)

*Primary Examiner* — Umut Onat
(74) *Attorney, Agent, or Firm* — Schwegman Lundberg & Woessner, P.A.

(57) ABSTRACT

A message-based processing system is disclosed. An input message received in the message-based processing system comprises a first indication of at least a subset of a plurality of processor elements and a second indication of a target pattern. Each of the plurality of processor elements has an addressable storage entry with a processor element address storing a processor element state. An initial address computation mode is selected from a set of address computation modes. A state value of each of the processor elements in the subset is updated based on magnitude values of respective pattern elements of the target pattern. A currently applied pattern element of the target pattern in each case determines whether to maintain a current address computation mode of (Continued)

the set of address computation modes or assume a next address computation mode selected from the set of address computation modes.

20 Claims, 6 Drawing Sheets

(56) References Cited

U.S. PATENT DOCUMENTS

| | | | | |
|---|---|---|---|---|
| 11,960,946 | B2 * | 4/2024 | Yousefzadeh | G06F 9/546 |
| 2013/0198121 | A1 | 8/2013 | Modha et al. | |
| 2016/0179517 | A1 | 6/2016 | Arimilli et al. | |
| 2016/0364644 | A1 | 12/2016 | Brothers et al. | |
| 2017/0075691 | A1 * | 3/2017 | Plotnikov | G06F 9/355 |
| 2017/0316306 | A1 | 11/2017 | Katayama | |
| 2018/0285233 | A1 | 10/2018 | Norrie et al. | |
| 2019/0377688 | A1 * | 12/2019 | Basu | G06F 9/542 |
| 2023/0048845 | A1 | 2/2023 | Yousefzadeh et al. | |

OTHER PUBLICATIONS

"U.S. Appl. No. 17/787,203, Response filed Nov. 16, 2023 to Non Final Office Action mailed Aug. 17, 2023", 12 pgs.

"European Application Serial No. 19219021.3, Extended European Search Report mailed May 20, 2020", 10 pgs.

"European Application Serial No. 19219021.3, Noting of loss of rights pursuant to Rule 112(1) EPC mailed Jan. 25, 2022", 2 pgs.

"European Application Serial No. 20824947.4, Response to Communication pursuant to Rules 161(1) and 162 EPC filed Feb. 6, 2023", 17 pgs.

"International Application Serial No. PCT/EP2020/087159, International Preliminary Report on Patentability mailed Jun. 30, 2022", 12 pgs.

"International Application Serial No. PCT/EP2020/087159, International Search Report mailed Mar. 5, 2021", 4 pgs.

"International Application Serial No. PCT/EP2020/087159, Written Opinion mailed Mar. 5, 2021", 10 pgs.

* cited by examiner

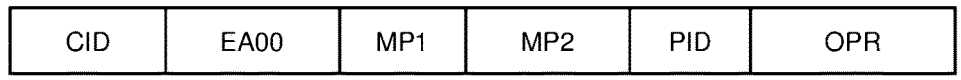
FIG. 5A
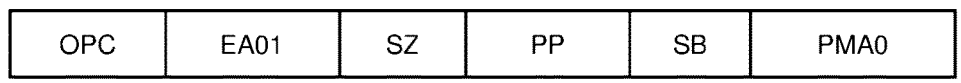
FIG. 5B
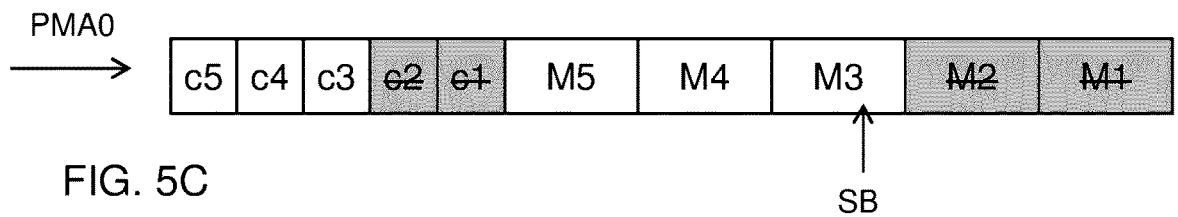
FIG. 5C
| 49 | 48 | 46 | 44 | 42 | 40 | | 32 | | 24 | | 16 | | 8 | | 0 |
|----|----|----|----|----|----|---|----|---|----|---|----|---|---|---|---|
| TRN | TRN | TRN | STR | STR | w011 | | w101 | | w001 | | w100 | | w000 |
| -- | -- | END | END | TRN | -- | | -- | | w110 | | w010 | | w111 |
FIG. 5D
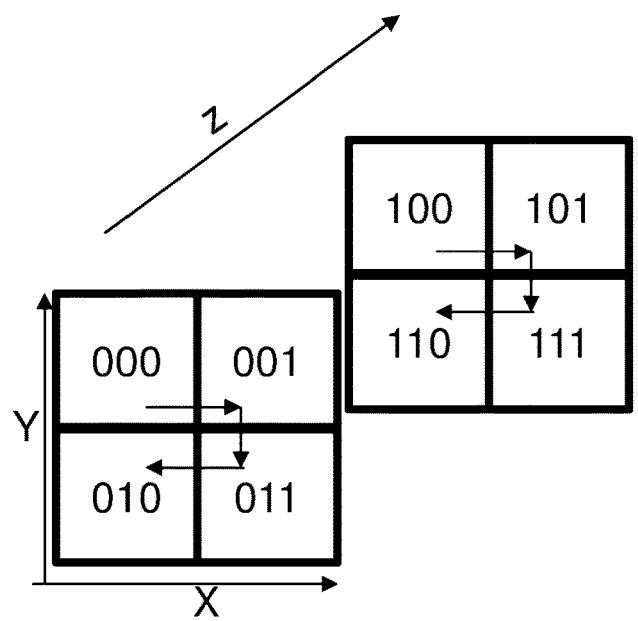
FIG. 5E

| 49 | 48 | 46 | 44 | 42 | 40 | 36 | 32 | 28 | 24 | 20 | 16 | 12 | 8 | 4 | 0 |
|---|---|---|---|---|---|---|---|---|---|---|---|---|---|---|---|
| STR | STR | SKP | STR | STR | 0 | X | 0 | X | 5 | X | X | X | X |
| END | SKP | STR | STR | SKP | 0 | X | 11 | X | X | X | X | 3 |

| 49 | 48 | 46 | 44 | 42 | 40 | 32 | 24 | 16 | 8 | 0 |
|---|---|---|---|---|---|---|---|---|---|---|
| STR | STR | SKP | STR | STR | w101 | w001 | 2 | w100 | w000 |
| STR | SKP | TRN | TRN | SKP | w012 | 2 | w102 | w002 | 2 |
| SKP | TRN | TRN | SKP | STR | 2 | w122 | w022 | 2 | w112 |
| TRN | TRN | SKP | STR | STR | w120 | w020 | 2 | w121 | w021 |
| END | SKP | TRN | TRN | SKP | w011 | 2 | w110 | w010 | 2 |
| - | - | - | - | END | - | - | - | - | w111 |

MESSAGE-BASED PROCESSING SYSTEM WITH ADDRESS COMPUTATION MODES

CLAIM OF PRIORITY

This application is a continuation of U.S. patent application Ser. No. 17/787,203, filed on Jun. 17, 2022 (which issued as U.S. Pat. No. 11,960,946 on Apr. 16, 2024), which is a U.S. national-phase application filed under 35 U.S.C. § 371 from International Application Serial No. PCT/EP2020/087159, filed on Dec. 18, 2020, and published as WO 2021/123260 on Jun. 24, 2021, which claims the benefit of priority to European Patent Application Serial No. 19219021.3, filed on Dec. 20, 2019, each of which is incorporated herein by reference in its entirety.

BACKGROUND

The present application relates to a message-based processor system.

The present application further relates to a method of operating a message-based processor system.

A message-based processor system comprises a plurality of message-based processor system cores that in operation exchange event messages with each other via a message exchange facility, for example a message exchange network, or a dedicated message bus between each pair of communicating processor system cores. A message-based processor system may for example execute a neural network, and message-based processor elements of the message-based processor system may represent neural network processor elements therein. Typically such applications require a high or even full connectivity. For example each neural element in a convolutional neural network layer may be connected to a plurality of neural elements in a preceding layer. For example a 5×5 convolutional neural network layer would require 25 connections for each of its neural elements. Accordingly, if the neural network is executed on message-based processor system this would require that the message-based processor element can receive event messages from each of the message-based processor elements representing the connected neural elements in the preceding layer. In other cases a neural network layer may be fully connected to the preceding layer, which would require an even higher message exchange capacity. In practice this may impose a large burden on the message exchange facility. Accordingly, there is a need to mitigate bandwidth requirements.

SUMMARY

In order to address the need specified above, a message-based processor system is provided herein as claimed in claim 1.

The message-based processor system comprises a first plurality of message-based processor system cores. Each core comprises a second plurality of processor elements, respective third pluralities of addressable storage entries specifying pattern information of a respective target pattern and a processor element controller.

Each of the second plurality of processor elements has a respective second addressable storage entry with a respective processor element address where a respective processor element state is stored. The respective processor element address is associated with at least a first coordinate (x) along a first coordinate axis (X), a second coordinate (y) along a second coordinate axis (Y) and a third coordinate (z) along a third coordinate axis (Z). In some embodiments the processor element address is associated with one or more additional coordinates for example a fourth coordinate (t) indicative for a time, along fourth coordinate axis (T).

The pattern information of a target pattern comprises for each of its pattern elements a respective magnitude value as well as a respective control value. The control value is selected from a fourth plurality of optional control values.

The processor element controller is configured to receive an event message that comprises an indication of a subset of the second plurality of processor elements as well as an indication of a target pattern. The processor element controller is further configured to update the state value of respective processor elements in the indicated subset in accordance with the magnitude value of respective pattern elements succeeding each other in the indicated target pattern. The respective processor elements in the indicated subset comprise a first processor element and one or more succeeding processor elements. The processor element controller has an address computation function to compute the address of the indicated subset. The address of the first processor element is provided as a base value, for example by the input message, or as a stored address value or a combination thereof. Starting with the address of the first processor element the address of each next processor element is computed by adding or subtracting an address step to the address of the processor element that precedes that next processor element in the indicated subset. The processor element controller is operable in a selected one of a cyclic set of optional computational modes. Each of the optional computational modes in the cyclic set corresponds to a respective value for the address step applied in the address-computation function. The address computation mode is selected from a cyclic set of optional computational modes. Upon receiving an input message the processor element controller may assume a predetermined initial address computation mode. Dependent on the control value of the pattern element that is associated with the current processor element, the processor element controller may maintain its current address computation mode or assume a next address computation mode in the cyclic set. Due to the fact that the operational address computation modes are available as a cyclic set, it is possible to provide for a transition from any available operational mode to any other available operational mode with only a single bit of pattern information for each pattern element.

The addition or subtraction as the address calculation step may be considered a displacement in a particular direction over a particular distance in the space defined by the coordinate axes X,Y, Z, or optionally further defined by one or more additional coordinates. The particular distance may for example be the unit distance 1, and the cyclic set of address computation modes may for example comprise a first address computation mode, a second address computation mode, a third address computation mode and a fourth address computation mode in a computation mode cycle.

In the first address computation mode the change of address corresponds to a change of the first coordinate (x) in a first direction (+) along the first coordinate axis (X), hence:

$$x \leftarrow x+1.$$

In the second address computation mode the change of address corresponds to a change of the second coordinate (y) in a second direction (+) along the second coordinate axis (Y), hence:

$$y \leftarrow y+1.$$

In the third address computation mode the change address corresponds to a change of the first coordinate (x) in a direction (−) opposite to said first direction. Hence:

$$x \leftarrow x-1.$$

In the fourth address computation mode the change of address corresponds to a change of the second coordinate (y) in a direction (−) opposite to said second direction, i.e.

$$y \leftarrow y-1.$$

Presuming that the processor element address PA is related to its coordinates by the relationship:

PA=x+W*y+W*H*z, wherein W defines the linewidth and H defines the number of lines in a plane this implies that the next address is computed as follows:

In the first address computation mode the change of address is:

$$PA \leftarrow PA+1.$$

In the second address computation mode the change of address is $$PA \leftarrow PA+W.$$

In the third address computation mode the change of address is:

$$PA \leftarrow PA-1.$$

In the fourth address computation mode the change of address is:

$$PA \leftarrow PA-W.$$

Alternatively another set of address computation modes may be provided. For example a set of three address computation modes, wherein the first two address computation modes are identical to those in the previous example, but wherein the third address computation mode computes a change of address that corresponds to a change of the first coordinate (x) in a direction (−) opposite to said first direction and a change of the second coordinate (y) in a direction (−) opposite to said second direction, i.e.

$$x \leftarrow x-1$$
$$\text{and}$$
$$y \leftarrow y-1,$$
$$\text{so that}$$
$$PA \leftarrow PA - W - 1$$

A fourth plurality of optional control values may for example comprise a first optional control value and a second optional control value. In accordance therewith, the processor element controller (PEC) may be configured to maintain its address computation mode if the control value of the current pattern element is the first optional control value and to select the next address computation mode in the abovementioned cycle if the control value is the second optional control value.

In an embodiment, of the message-based processor system the fourth plurality of optional control values further comprises a third control value to indicate that a pattern element is the last one of a set of pattern elements. Alternatively, a total number of elements may be specified in the input message, in a pattern header or may be a predetermined number.

In an embodiment, of the message-based processor system, the fourth plurality of optional control values comprises a fourth control value. In accordance therewith, the Processor Element Controller (PEC) upon determining that the control indicator has the fourth control value is configured to apply a magnified address step which is the product of the address step of its current address computation mode and the magnitude value of the current pattern element.

In an embodiment, the message-based processor system is further configured to subsequently address each processor element having a same value (e.g. x, y) of two of its coordinates (X,Y) within a range determined by a target pattern size (e.g. SZ) of a target pattern in the direction of the axis of a third one of the coordinates (e.g. Z), before computing a subsequent address by a change of value of said first or second coordinate. This is particularly suitable for computing multi-feature maps, wherein each position in the x-y plane is associated with a plurality of features, each feature being represented with a respective z-value. As a simple example the plurality of features may be the values for the color components R,G,B wherein each color component has a respective z-plane.

In an embodiment, the message-based processor system further comprises a fifth plurality of addressable storage entries, for example comprised in a dedicated pattern header memory (PHM), to contain header information of a respective target pattern. The header information may comprise a further second indication (PMA0) to a representative one of a subset of the third plurality of addressable storage entries, for example comprised in a dedicated pattern memory (PM). In this way an input message does not need to directly specify the address of the pattern to be applied, but may instead specify an index designating a specific one of the fifth plurality (PHM) of addressable storage entries. Therewith the message size can be reduced.

The header information of a target pattern may contain additional information related to the pattern, such as a target pattern size specifying the number of features. The header information of a target pattern may also comprise an indication for a representative one of the second plurality of processor element.

The processor element controller may for example use this information to compute the address of the first processor element to be accessed upon receipt of an input message. The computed address may for example be the sum of said indication in the header and the indication provided in the input message. This also contributes to a reduction of message size.

In an embodiment of the message-based processor system respective addressable storage entries of the third plurality (PM) of addressable storage entries comprise pattern information of respective sets of pattern elements of a target pattern. Each storage entry may for example comprise pattern information of a set of four pattern elements. The storage entry may for example comprise a first section with respective first subsections for each control value of a pattern element and a second section with respective second subsections specifying magnitude values.

The magnitude values of pattern elements may be stored with a precision that can be dynamically configured for a particular application. For example, in some applications a relatively high precision, e.g. 8 bits precision may be required for each pattern element, whereas in other applications a relatively low precision may be sufficient. The header information may comprise an indication for a precision with which, in a particular application, the magnitude values of pattern elements are stored in the subset of the third plurality of addressable entries. Therewith, the pattern element information can always be efficiently stored. By way of example, the header may comprise a two-bit value that specifies that the magnitude values are stored with 1 bit, 2 bit, 4 bit or 8 bit precision. In that case second subsection respectively comprises 8 magnitude values, 4 magnitude values, 2 magnitude values or 1 magnitude value. A pattern header memory may have mutually different headers specifying mutually different precisions for mutually different applications.

To still more efficiently store pattern information, the header information may further comprise an indication of a position inside said first one of a subset of the third plurality of addressable storage entries. For example, it may be the case that a storage entry with pattern information comprises a five first subsection and five second subsections, wherein a 3-bit indication specifies which of the first subsections and which corresponding one of the second subsections is associated with the first pattern element of the pattern.

BRIEF DESCRIPTION OF THE DRAWINGS

These and other aspects are described in more detail with reference to the drawings.
Therein:
FIG. 5A illustrates an example of a message to be processed;
FIG. 5B illustrates an exemplary pattern header;
FIG. 5C illustrates an exemplary first pattern memory entry;
FIG. 5D illustrates two subsequent entries in pattern memory representing a complete pattern;
FIG. 5E illustrates the pattern.

DETAILED DESCRIPTION OF EMBODIMENTS

Figure 1:
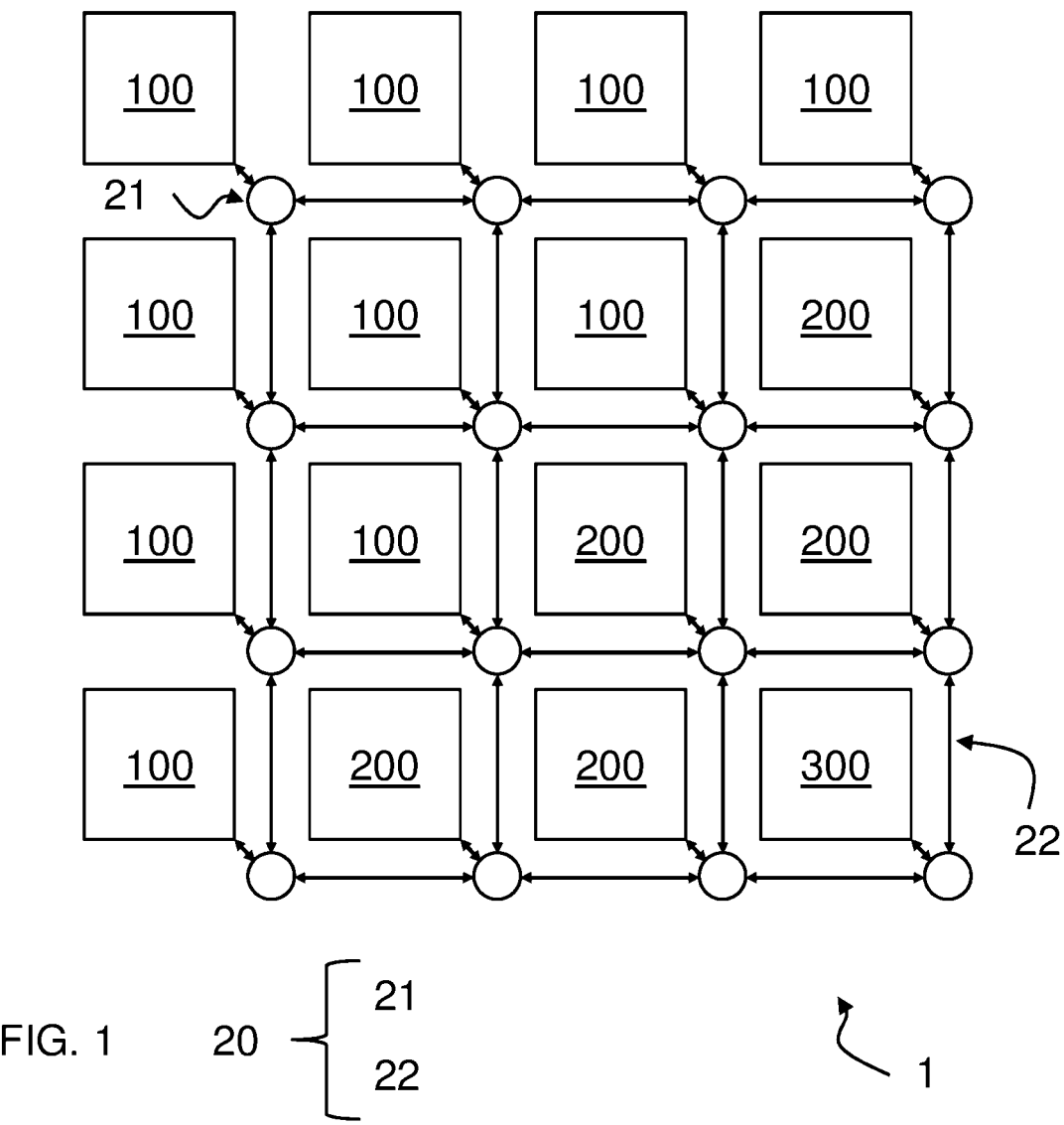
FIG. 1 schematically shows an example of a message based processor system.

FIG. 1 schematically shows a message based processor system 1 that comprises a first plurality of message based processor system cores 100. In this example the message based processor system comprises 16 message-based processor system cores 100. The message-based processor system cores 100 are coupled to a network 20 comprising respective network nodes 21 for each message based processor system core 100 and network links 22 coupling the network nodes 21. The network 20 enables a processor system core to send a message to another processor system core. In this case each processor system core can send a message to each other processor system core via one or more nodes 21 of the network 20, or even send a message to itself. Also other network architectures may be contemplated, comprising respective groups of network connected processor system cores. Also a network architecture may be contemplated wherein the processor system cores are arranged as layers, wherein each processor system core, except the last one can send messages to the next processor system core in the sequence.

Figure 2:
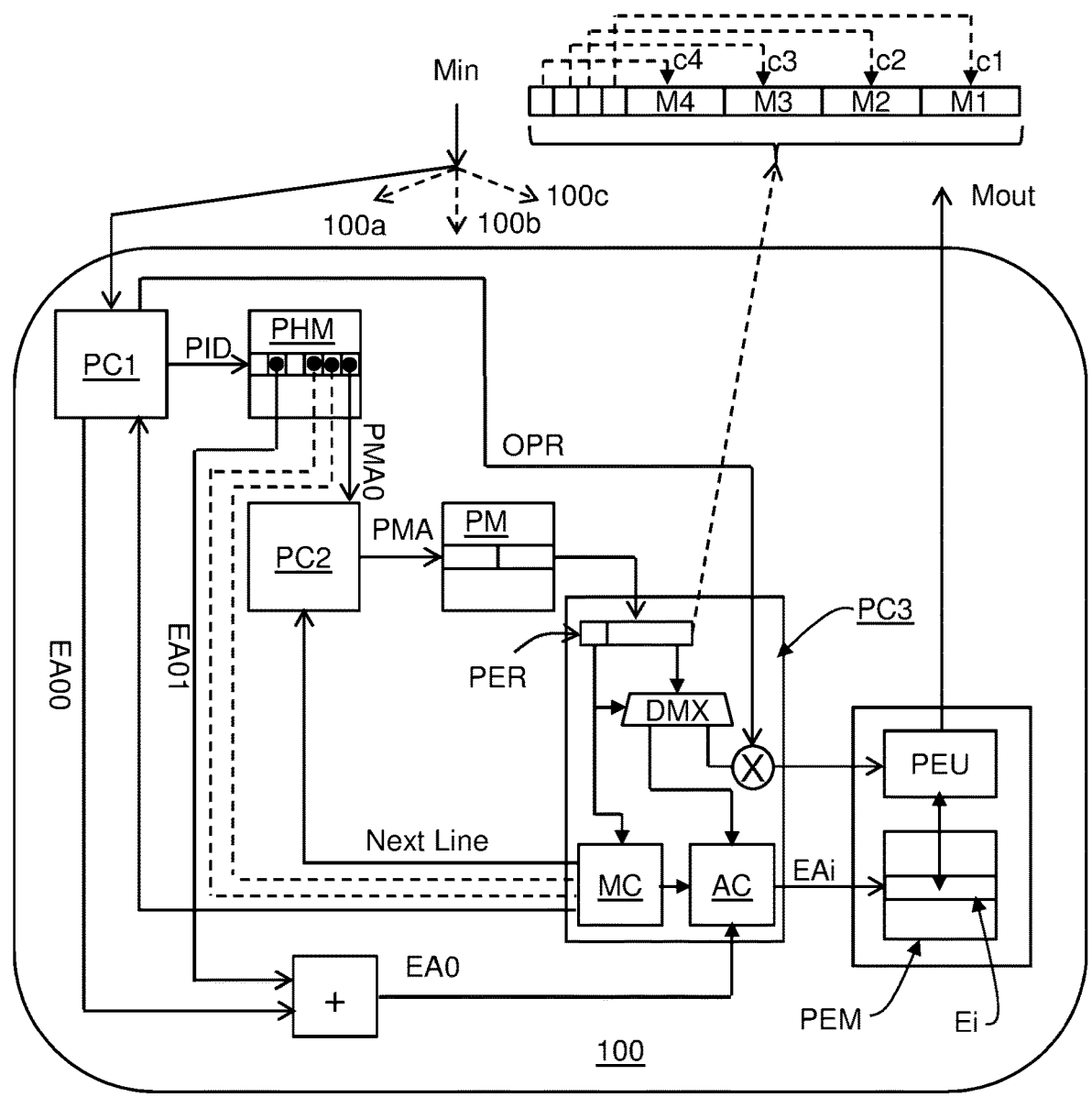
FIG. 2 shows in more detail an embodiment of a processor system core of the message-based processor system as proposed herein.

FIG. 2 shows an exemplary processor system core 100. A processor system core as shown in FIG. 2 comprises a second plurality of processor elements Ei. The processor elements each have a proper second addressable storage entry with a respective processor element address EAi storing a respective processor element state. The processor element address EAi can be associated with a first coordinate (x) along a first coordinate axis (X), a second coordinate (y) along a second coordinate axis (Y) and a third coordinate (z) along a third coordinate axis (Z). For example, the relationship between the address EAi of a processor element and its coordinates x,y,z may be given by the following relationship: $EAi=x+W*y+W*H*z$, wherein W defines the linewidth and H defines the number of lines in a plane with a fixed coordinate value for z. In some embodiments, the coordinates x,y may be indicative for a position in an image or feature map, and the coordinate z may specify a respective one of a plurality of features. For example the states of the processor elements associated with coordinates x,y,0; x,y,1; x,y,2 may represent the R,G,B color value at a position x,y in an image. As another example, the states of the processor elements associated with coordinates x,y,0; x,y,1; x,y,2, . . . ,x,y,n may represent respective features f0,f1, f2, . . . ,fn at the position x,y in a feature map. These can be well known features, such as a gradient in each of an x-direction, a y-direction and in a first and a second diagonal direction, but these may also be features that were learned by the processor in a training process.

The processor system core 100 also comprises respective third pluralities of addressable storage entries specifying information of a respective target pattern. In this example a dedicated pattern memory PM is provided for this purpose. Alternatively, the respective third pluralities may be provided as a partition in a memory used for other purposes. The information comprises for respective pattern elements of a pattern a respective magnitude value and a respective control value selected from a fourth plurality of optional control values. It is noted that a respective addressable storage entry may be provided for each pattern element. Alternatively, pattern information for a set of pattern elements may share a common addressable storage entry.

The processor system core 100 also comprises a processor element controller which in this embodiment comprises various discrete control components PC1, PC2, PC3, PEU that enable the processor element controller to perform various functions. In this case the control component PC1 receives the message Min, identifies therein the first indication EA00 and the second indication, pattern identification (PID) and other relevant message data. It addresses the pattern header memory PHM. Control component PC2 is configured to address pattern memory PM starting from base address PMA0 retrieved from the pattern header memory. Control component PC3 is to process the pattern element information retrieved from the address pointed to by controller PC2 and is responsible for controlling the processor element update unit to update the processor elements in accordance with the pattern data and the operand value OPR of the message.

Alternatively a single general purpose controller may be provided.

An exemplary event message is shown in FIG. 5A. As shown therein, an event message as transmitted may comprise a core identification (CID) of the processor core, a first indication EA00 of the subset of the second plurality of processor elements Ei to which the message is directed, as well as a second indication PID of a target pattern. The first indication EA00 may be sufficient to determine the subset of processor elements. Alternatively, as is the case in this example it may be combined with one or more additional first indications to determine which subset of processor elements is referred to. Likewise, the second indication PID may be sufficient to determine the set of storage entries containing the target pattern. Alternatively, as is the case here, it may be combined with one or more additional second indications to determine where the pattern element information is provided. In this case the second indication PID is a reference to one of a fifth plurality of addressable storage entries, here provided in a dedicated memory unit PHM, but alternatively a partition in a shared memory unit. Each of a plurality of target patterns has a proper addressable entry in the dedicated memory unit PHM. An addressable entry contains header information of its associated respective target pattern. An example thereof is shown in FIG. 5B. The header information comprises an additional second indication PMA0 to a representative one of the subsets of the third plurality PM of addressable storage entries. Therewith the address of a first one of the third plurality PM of addressable storage entries is found indirectly by the second indication PID in the received message in that the second indication PID specifies a pattern header entry in memory PHM, and the additional second indication PMA0 therein in its turn specifies the location in pattern memory unit PM. The header information also comprises an additional first indication EA01 to a representative one of the second plurality of processor elements Ei. As schematically shown in FIG. 2, the address EA0 of a first one of the second plurality of processor elements being the target of the message is determined by the sum of the first indication EA00 and the additional first indication EA01 in the pattern header. The header information may also comprise further general information related to the pattern, such as a size SZ of the pattern in the direction Z. Also the pattern header may specify a precision PP with which the pattern information for individual elements is stored. Furthermore, an indicator SB may be provided in the header that indicates a location of the first pattern element. In the example shown in FIG. 5C, the header indicates with the value of SB that the first pattern element is provided in the third subsection of the addressable entry indicated by address PMA0. Hence, the pattern element data of the pattern element of the target data can directly succeed the pattern element data of another pattern element (in this example provided in the first and the second subsection of the storage entry shown in FIG. 5C.

The processor element controller has a third control component PC3 that is to update the state value of respective processor elements (Ei) in the subset in accordance with the magnitude value of respective succeeding elements of the pattern. The processor element controller is configurable in an address computation mode selected from a cyclic set of address computation modes. This is for example the set of 4 address computation modes described in the introduction. The processor element controller is further configured to maintain its computation mode or assume a next address computation mode selected from the cyclic set dependent on whether the control value of the currently applied pattern element is a first optional control value or a second optional control value respectively. In the embodiment shown, this is the case in that the third control component PEC3 has a mode controller MC.

The processor element controller is configured to assume an initial address computation mode selected from the cyclic set. In this case, the mode controller MC determines the selection of the address computation mode and it correspondingly instructs an address computation module AC to compute the processor element address $EA_{i+1}$ of a succeeding processor element by addition of an address step to the processor element address $EA_i$ of a processor element preceding that succeeding processor element. Respective address computation modes correspond to respective mutually different address steps. For example, as indicated in the table below:

| Address Computation Mode | Address step |
| --- | --- |
| 1 | +1 |
| 2 | +W |
| 3 | −1 |
| 4 | −W |

Pattern element information may be stored in various ways. Examples thereof are presented in FIG. 3A-3E.

Figure 3A:
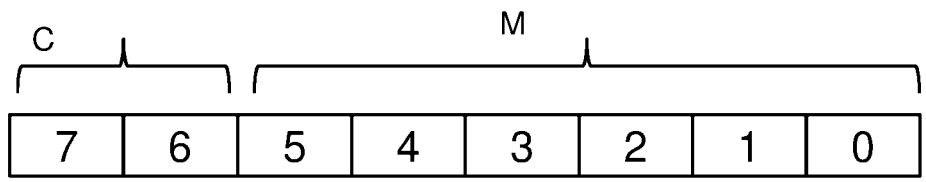
FIG. 3A-3F shows various pattern element storage formats.

FIG. 3A shows a first example, wherein pattern information for a single pattern element is stored in a single addressable 8-bit entry. The pattern information comprises a 6-bit magnitude indicator M and a 2-bit control indicator C. The 6-bit magnitude indicator may specify a weight to be applied when updating a processor element, but may alternatively serve another purpose, depending on the value of the control indicator.

Figure 3B:
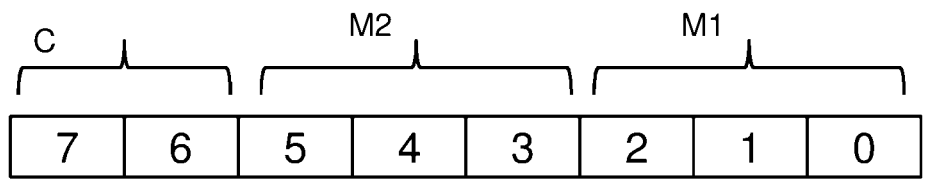

FIG. 3B shows a second example, wherein pattern information for a pair of pattern elements is stored in a single addressable 8-bit entry. The pattern information comprises the respective magnitude information with 3-bit precision for each of the pattern elements and a shared control indicator C.

Figure 3C:
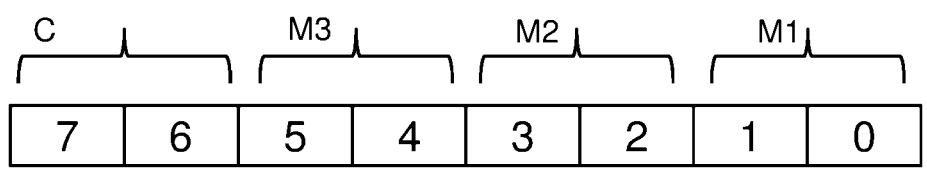
Figure 3D:
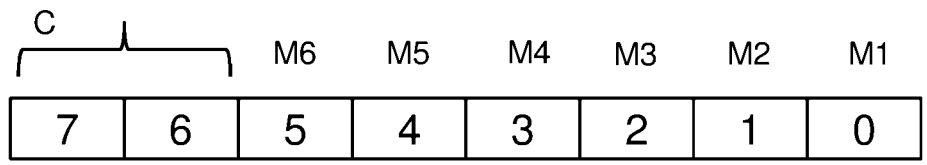

As further examples FIGS. 3C and 3D show storage of pattern information for 3 pattern elements with 2-bit magnitude information and storage of pattern information for 6 pattern elements with 1-bit magnitude information.

Figure 3E:
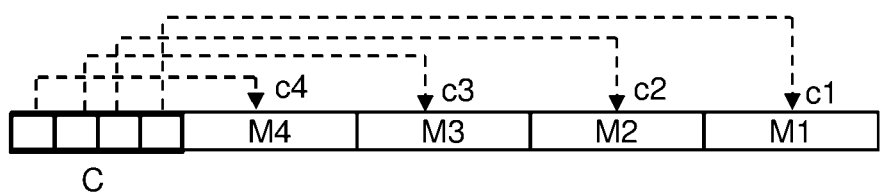

In the embodiment of FIG. 3E, pattern information of 4 pattern elements is stored in a shared 50-bit memory entry. The first four bytes comprise 8-bit precision magnitude information M1, M2, M3, M4 for each of the four pattern elements, and the fifth byte comprises control information C with respective control indicators c1, c2, c3, c4, comprised in the control information C.

Figure 3F:
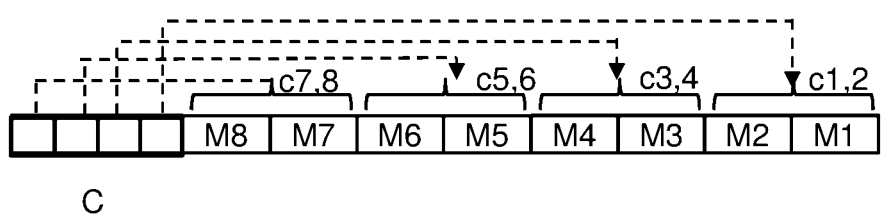

FIG. 3F shows one further example. Therein, pattern information of 8 pattern elements is stored in a shared 50-bit memory entry. The first four bytes each comprise with 4-bit precision magnitude information M1,M2; M3,M4; M5,M6 and M6,M7 for a respective pair of pattern elements, and the fifth byte comprises control information C with a respective control indicator c1,2, c3,4 c5,6, c7,8 for each pair of pattern elements.

Figure 4:
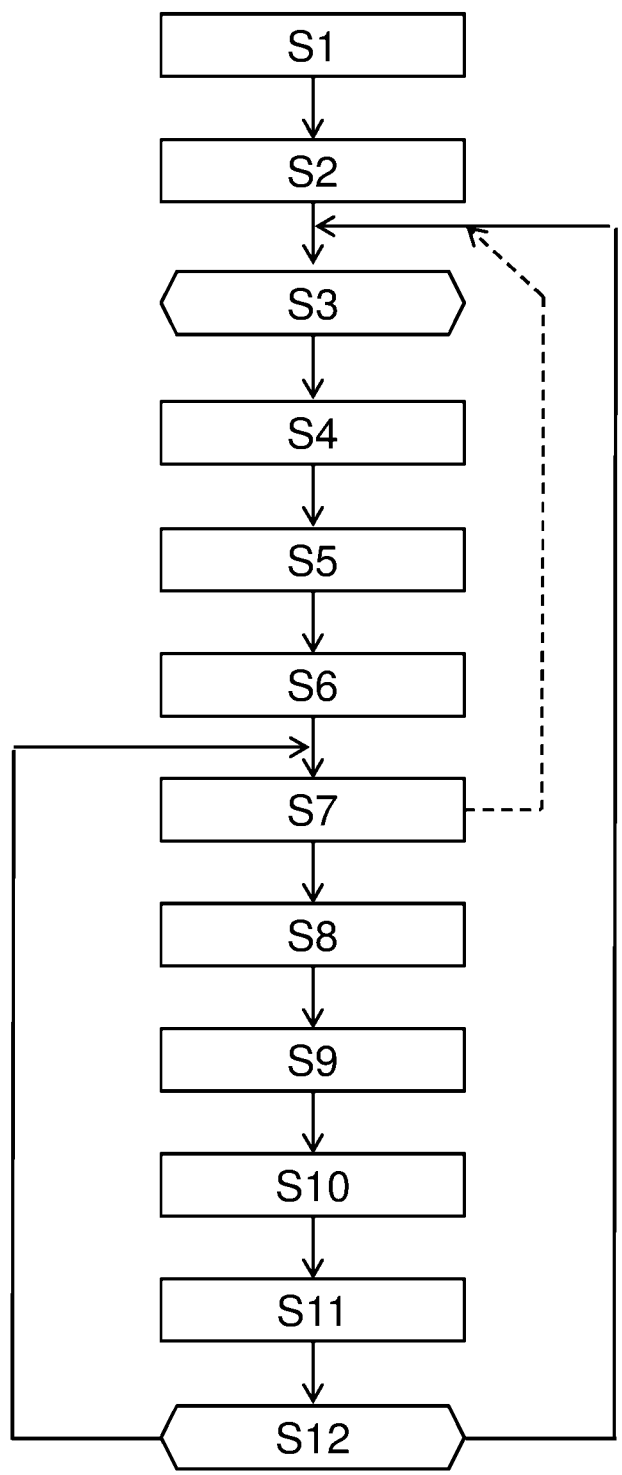
FIG. 4 shows a method of operating a message-based processor system as proposed herein.

FIG. 4 schematically shows a method of operating a message-based processor system 1 that comprises a first plurality of message based processor system cores 100.

The method involves a step S1 of providing a second plurality of storage locations for maintaining respective processor element states. In the example shown in FIG. 2, a processor element memory PEM provided with the second plurality of storage locations. The processor element memory PEM is accessible by a shared processor element update module PEU.

Alternatively the processor elements may be autonomous units, having in addition to their storage location a proper computation element. Each of the second plurality of storage locations, has a respective address, denoted as processor element address EAi. A processor element address EAi is associated with a first coordinate x along a first coordinate axis X, a second coordinate y along a second coordinate axis Y and a third coordinate z along a third coordinate axis Z, for example according to the following relationship:

EAi=x+W*y+W*H*z wherein W defines the linewidth and H defines the number of lines in a plane.

In step S2 a third plurality of addressable storage entries are provided. Pattern information of respective target patterns is stored in respective subsets of the third plurality of addressable storage entries, in the example of FIG. 2 a dedicated memory unit PM. The pattern information comprises for respective pattern elements of said pattern a magnitude indicator with a magnitude value and a control indicator with a control value. In the example shown the third plurality of addressable storage entries provided in the memory unit PM comprise 5 byte fields as illustrated in FIG. 3E. Alternatively, the third plurality of addressable storage entries, may have another size, for example as shown in FIG. 3A-3D.

Also the pattern information may be stored with a smaller number of magnitude bits, for example 3,2 or 1 bits, as shown in FIG. 3B-3D respectively, or with 4-bits as shown in FIG. 3F.

As a step S3, an input message Min is received that comprises a target pattern indication PID with a target pattern indication value and a target processor element subset EA00 indication with a target processor element subset indication value; A part of the input message CID indicates the processor system core 100, 100a, 100b, 100c, to which the input message is directed, and is no longer relevant. Other information may be included, such as an operand OPR and further message parameters MP1, MP2.

The target pattern indication may directly specify a target pattern memory location of the target pattern to be applied, for example, it may specify the first target pattern memory location of a series of target pattern memory locations in pattern memory PM, that defines the target pattern. Instead, in the embodiment shown in FIG. 2, the target pattern indication PID specifies a target pattern header memory location within pattern header memory PHM. The header specified of the target pattern comprises a reference PMA0 to the target pattern memory location in pattern memory PM of the target pattern to be applied. The location specified is for example the first target pattern memory location of a series of target pattern memory locations that defines the target pattern. Additionally the target pattern header memory location referred to may store general information about the pattern, such as the pattern size SZ in the direction Z and the precision MP with which the pattern magnitude information is stored in the series of target pattern memory locations that defines the target pattern.

In a step S4, an initial address computation mode is selected by mode controller MC from a cyclic set of address computation modes. For example, the first address computation mode may be selected, wherein the change of address corresponds to a change of the first coordinate (x) in a first direction (+) along the first coordinate axis (X), so that:

$$EA \leftarrow EA + 1.$$

In a step S5 a processor element address EA0 is initially designated in accordance with the target processor element subset indication value of the target processor element subset indication EA00. The target processor element subset indication EA00 may directly specify the processor element address PA. Instead, in the embodiment of FIG. 2, the target processor element subset indication specifies the processor element address EA0 in combination with another indication. In the present case, a second target processor element subset indication EA01 is provided in location of the target pattern header memory PHM, specified by pattern indication PID, see FIG. 5B.

The address EA0 associated with the first processor element is then computed as:

$$EA = EA0 = EA00 + EA01$$

In a step S6 an addressable storage entry of the third plurality of addressable storage locations in memory unit PM is designated, which belongs to a pattern element that is indicated with the target pattern indication value of the target pattern indication. In the example of FIG. 2, this is the storage entry specified by the value of the pattern element indicator PMA0 provided in the header of the target pattern.

Subsequently, in a step S7 pattern information of that pattern element is retrieved from the indicated storage entry. In the example shown information for a plurality of pattern elements is stored as shown in the example of FIG. 3E.

More in particular, the designated storage entry comprising a magnitude information section with a plurality of magnitude information subsections to store magnitude data M1, M2, M3, M4 and a control information section with a plurality of control information subsections to contain a control indicator c1, c2, c3, c4 having a respective control value selected from a plurality of optional control values. In this case each magnitude information subsection is associated with a respective control information section. Alternatively, a control information subsection may apply to a plurality of magnitude information subsections. Also embodiments are possible wherein each pattern element has a proper storage location, as for example shown in FIG. 3A.

In the embodiment shown the processor element controller module PE3, retrieves the content of a pattern memory storage location into a pattern element register PER, and subsequently reads the pattern element information of the individual elements from this register. Alternatively, the processor element controller module PE3 may directly read information from each pattern element from the pattern memory PM.

Starting with the first pattern element, the following information is retrieved in step S7:
 a) The content (magnitude value) of the magnitude information subsection M1.
 b) The content (control value) of the control information subsection c1.

For now it is presumed that the control value can be one of:
 TRN, e.g. 01: Turn
 STR, e.g. 10: Straight Then, in a step S8, the state of the processor element having the designated processor element address is updated in accordance with the specified magnitude value. In addition the input message may specify an operand OPR involved in the updating. For example the processor element having the designated processor element address is updated in accordance with the product of the specified magnitude value M1 and the value of the operand OPR as is schematically indicated by the product icon X in the control component PC3. For the present application, it is not essential in what way updating the state is performed. The magnitude value, or its product with the value of the operand may for example be added to the state value, or multiplied with the state value. FIG. 2 also shows that in this operation mode, the magnitude value of M1 is provided to the multiplication element X via a demultiplexer element DMX.

In the embodiment shown, the processor element update unit PEU performs the update step S8 in a time-shared manner for the processor elements. Alternatively, the processor elements may be capable of performing the update autonomously. A result of the update step S8 may further be that an output message Mout is issued, for example, if a state value of the processor element exceeds a threshold value. In step S9 it is determined whether the current address computation mode is to be maintained, which is the case if the control value is STR or whether instead, the next address computation mode in said cyclic set of address computation modes is selected, which is the case if the control value is TRN.

For example, if it is determined that the control value is TRN then the second address computation mode may be selected by mode controller MC as the successor of the first address computation mode. If the current address computation mode is the fourth one in the cycle, then the first address computation mode is selected as its cyclic successor.

Then in step S10 a subsequent processor element address is computed in address update unit AC in accordance with the selectively updated address computation mode.

Also in step S11 the next pattern element to be accessed is identified. In this case the pattern element data (M1, c1) of the next pattern element is comprised in the pattern element information fetched in the pattern element register. Alternatively the pattern element data of the next pattern element may be provided in a subsequent storage location, dependent on the storage format used.

As schematically indicated by step S12, the procedure described above is now repeated from step S7 onwards until a stop condition is valid. The stop condition may be a determining that repetition took place a predetermined number of times, for example as specified in the input message Min or in the pattern header memory PHM. Alternatively, the control indication may assume a control value END, (e.g. 00) that indicates that a pattern element is the last one of a pattern. In that case the procedure ends after step S7, as indicated by the broken line in FIG. 4, so that the core is ready to process a new message.

Now a further example is described with reference to FIGS. 5D and 5E.

It is presumed that steps S1-S6 of the procedure are completed and that the pattern element information is specified in two subsequent addressable locations as shown in FIG. 5D. Also it was determined, for example from the pattern header information that the size of the pattern in the Z-direction is 2. Furthermore, it is assumed that mode controller has assumed the first one of the set of address computation modes as its initial address computation mode.

The pattern is schematically shown in FIG. 5E.

Starting with the first pattern element, the following information is retrieved in step S7:

a) The content (magnitude value) of the magnitude information subsection w000.

b) The content (control value) of the corresponding control information subsection. In this case the control value is STR.

Then, in a step S8, the state of the processor element having the designated processor element address EA=EA0 is updated in accordance with the specified magnitude value of w000 and possibly an operand value provided in the input message.

Because in this case, the pattern extends in the Z-direction, the processor element controller subsequently addresses each processor element having a same value x, y of its first and second coordinate X,Y within a range determined by a target pattern size SZ of a target pattern in the direction of the third coordinate axis Z, before computing a subsequent address by a change of value of said first or second coordinate. Consequently, the state of the processor element associated with processor element address EA+W*SZ (=EA0+W*SZ) is updated in accordance with the magnitude value of the proper magnitude indicator w100. In case that the target pattern size SZ has another value n, e.g. n=8, the processor element controller PE3 would subsequently update the processor elements associated with processor element address EA+2*W*SZ, EA+3*W*SZ, . . . , EA+n*W*SZ (EA0+2*W*SZ, EA0+3*W*SZ, . . . , EA0+n*W*SZ), in accordance with the magnitude values of w200, w300, . . . , wn00. Alternatively, it may be contemplated to change the role of the directions X, Y, Z. I.e. the processor element controller may subsequently addresses each processor element having a same value x, z of its first and third coordinate X,Z within a range determined by a target pattern size in the direction Y of a target pattern before computing a subsequent address by a change of value of said first or third coordinate. Also, the processor element controller may subsequently addresses each processor element having a same value y, z of its second and third coordinate Y,Z within a range determined by a target pattern size in the direction X of a target pattern before computing a subsequent address by a change of value of said second or third coordinate.

Upon completion, address computation proceeds in module AC with the mode indicated by the control value STR starting from the address EA. Hence, presuming that the initial address computation mode is the first address computation mode, the next address is determined as EA←EA+1 (EA0+1).

Then the state of the processor element associated with this processor element address is updated in accordance with the magnitude values of w001. Analogously, the state of the processor element associated with processor element address EA+W*SZ (EA0+1+W*SZ) is updated in accordance with the magnitude value of the proper magnitude indicator w101.

The value of the control indicator for these pattern elements is TRN, which causes the mode controller MC to select the next address computation mode in the address computation mode cycle, which is the second address computation mode.

Accordingly, the next processor element address is determined as EA←EA+W (EA0+1+W), and the processor element controller updates the processor element associated with processor element address EA, with the magnitude value of w011. Subsequently the processor element controller retrieves a next line from pattern element memory PM into patter element register PER to read the magnitude value of w111, and updates the processor element associated with processor element address EA+W*SZ (EA0+1+W+W*SZ), with that magnitude value. The control value for these last two pattern elements is TRN, which causes the processor element controller to select the next address computation mode in the address computation mode cycle, which is the third address computation mode.

Accordingly, the next processor element address is determined as EA←EA-1.

The processor element controller updates the processor elements associated with processor element address EA and EA+W*SZ with the magnitude values of w010 and w111 respectively. Their corresponding control value equals END, which indicates the processor element controller that this is the last pattern element, so that it can return to procedural step S3, to receive a next input message.

Figures 6, 7A, 7B:
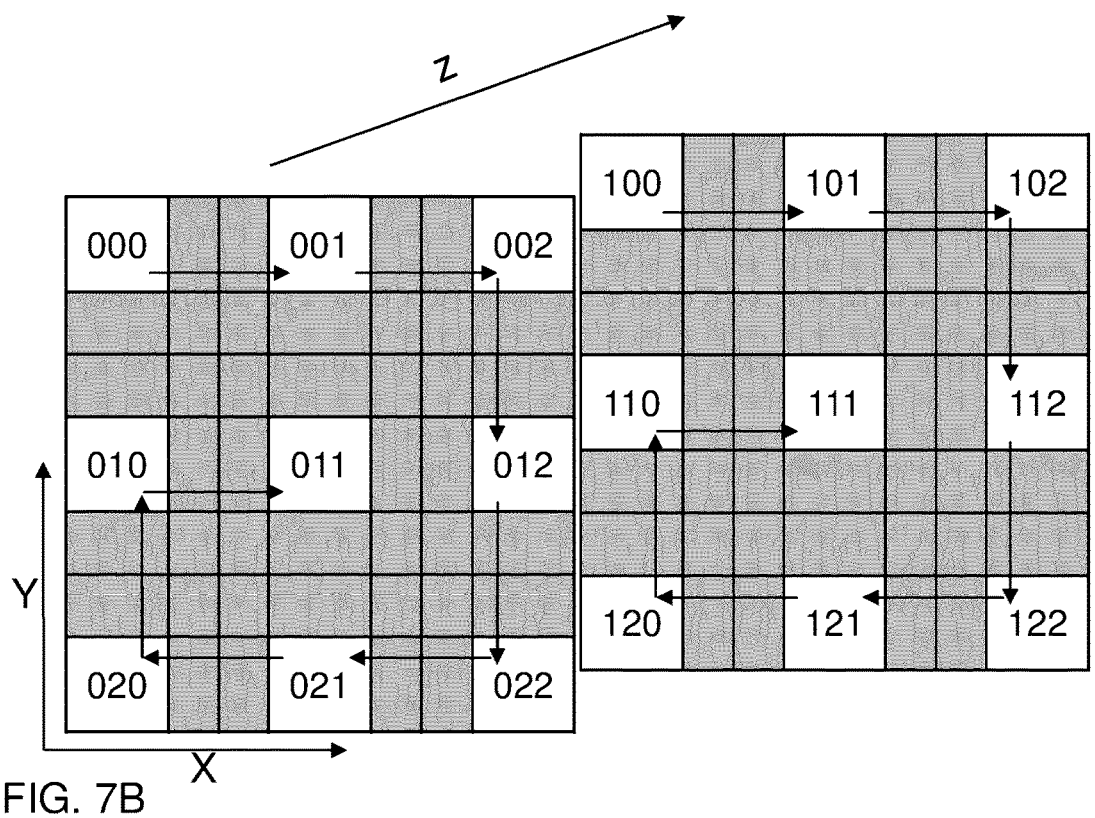
FIG. 6 illustrates two subsequent entries in pattern memory representing another pattern.
FIG. 7A illustrates six subsequent entries in pattern memory representing a still further pattern.
FIG. 7B illustrates the pattern specified in the pattern memory.

A further example is provided in FIG. 6. As in the previous examples, it is presumed that steps S1-S6 of the procedure are completed. Also it is assumed that the mode controller MC has assumed the first one of the set of address computation modes as its initial address computation mode. FIG. 6 is provided to illustrate the situation wherein the set of optional control values from which the control value of a pattern element may be selected, may further include the control value SKP, e.g. 11 (binary). This indicates to the mode controller MC that the magnitude indicator in this case does not indicate a weight to be applied to update the currently addressed processor element, but that instead the currently addressed processor element and a subsequent number of processor elements are to be skipped. For example if the magnitude indicator indicates a value n, this implies that the currently addressed processor element and the subsequent n−1 processor elements are skipped.

Therewith the processor element address EA is updated as:

$$EA \leftarrow EA + n$$

To that end the demultiplexer DMX directs the magnitude value of the pattern element to the address computation unit AC.

And the next pattern element is applied to the processor element with this address EA, unless the control indicator of the next pattern element also has the control value SKP. Incidentally, subsequent pattern elements may be assigned the control value B in case the dynamic range of the magnitude indicator is insufficiently large to specify the range to be skipped. In the example shown, the pattern information specifies a pattern with a size of SX=32, SY=1 and SZ=1. The size SZ is specified in the pattern header. The size SX, SY is implicit from the pattern specification in the pattern memory, as becomes apparent from the example. The header of the pattern in this example specifies with indicator MP that the pattern magnitudes are provided with 4-bit precision. The pattern represents a 1-dimensional vector, of the following form.

$$W = [X, X, X, X, 0, 0, 0, 0, 0, X, 0, X,$$
$$0, 0, 0, 0, X, X, X, X, 0, 0, 0, 0, 0, 0, 0, 0, 0, 0, 0, 0, X].$$

Therein the value '0' indicates a pattern value 0, implying that the corresponding processor element does not need to be updated, and the symbol 'X' indicates that the corresponding processor element has to be updated with the value of X, i.e. a 4-bit value.

This implies that processor elements EA0,EA0+1, . . . ,EA0+3 are updated in accordance with the weight values X specified in the first four elements of the vector W. Then the elements having address EA0+4, EA0+5, . . . EA0+8 are skipped, to proceed with the processor element with address EA0+9 etc.

In the pattern element memory PM this is indicated as follows.

As the magnitudes are provided with 4-bit precision, the magnitude indicator of each two pattern elements shares a single magnitude indication subsection, and a single control indicator subsection in a pattern memory entry.

In operation, the processor element controller fetches the control value STR from the first control subsection (bits 40, 41) of the accessed storage location. The control value STR indicates that the first magnitude subsection (bits 0-7) of the accessed storage location comprises weight information. As the weight information is provided with 4-bit precision, the first magnitude subsection comprises a first and a second weight indicator X, having a respective weight value. The control value STR indicates that the processor element address is to be stepwise increased in accordance with the current address computation mode, which is the first address computation mode assumed upon initialization. In accordance therewith, the processor element controller updates the processor elements with addresses EA, EA+1 (EA0, EA0+1) with these respective weight values.

As the control value of the first control subsection differs from the value END, the processor element controller fetches the control value STR from the second control subsection (bits 42, 43) of the accessed storage location. The control value STR indicates that the second magnitude subsection (bits 8-15) of the accessed storage location comprises weight information. As the weight information is provided with 4-bit precision, the second magnitude subsection comprises a first and a second weight indicator X, having a respective weight value. The control value STR indicates that the processor element address is to be stepwise increased in accordance with the current address computation mode, which is still the first address computation mode assumed upon initialization. In accordance therewith, the processor element controller updates the processor elements with addresses EA0+2, EA0+3 with these respective weight values an subsequently the processor element address is updated to EA0+4.

As the control value of the second control subsection differs from the value END, the processor element controller then fetches the control value of the third control subsection. The control indicator in the third control section (bits 44,45) has the control value SKP, which indicates the processor element controller that the third magnitude subsection (bits 16-23) provides a magnitude value, 5 in this example, that indicates the number of processor elements to be skipped, (i.e. to be updated with the weight 0). In accordance therewith the processor element address is updated from EA0+4 to EA0+9.

As the control value of the third control subsection differs from the value END, the processor element controller fetches the control value of the fourth control subsection (bits 46,47). This has the value STR. The control value STR indicates that the fourth magnitude subsection (bits 24-31) of the accessed storage location comprises weight information. As the weight information is provided with 4-bit precision, the fourth magnitude subsection comprises a first and a second weight indicator. In this case the first weight indicator X has a non-zero value and the second weight indicator has a weight value 0. The control value STR indicates that the processor element address is to be stepwise increased in accordance with the current address computation mode, which is the first address computation mode assumed upon initialization. In accordance therewith, the processor element controller updates the processor elements with addresses EA0+9, EA0+10 with these respective weight values, and subsequently updates the processor element address to EA0+11. Updating the processor element with address EA0+10 with the weight value 0 may in fact imply that this processor element is not updated at all, therewith saving a computation. It could further be contemplated to use the SKP control value, to indicate this. However, this would be less efficient in terms of memory usage, as the full fourth magnitude subsection would be required to store the skip value 1.

Similarly the processor element controller updates the processor elements with addresses EA0+11, EA0+12 with a non-zero and a zero weight value respectively, and subsequently updates the processor element address to EA0+13.

The processor element controller then accesses a next storage location of the third plurality of storage location. The control value SKP in the first control subsection (bits 40, 41) indicates that the corresponding first magnitude subsection comprises a value, here 3, indicating a number of processor elements to be skipped. Subsequently in accordance with the pattern information provided in this storage location, the processor element controller completes updating the processor elements with the sparse weight vector W.

A further example is illustrated in FIGS. 7A, and 7B. In this example a dilated (atrous) convolution pattern is applied. FIG. 7A, shows the specification of the target pattern in memory PM. The specification as shown in FIG. 7A comprises six addressable pattern memory lines. Each of the pattern memory lines comprises a control section (bits 40-49) with five control subsections and a magnitude indicator section (bits 0-39) with same number of magnitude subsections. It is further specified in the pattern header information that the depth Z of the pattern equals 2. Also it is specified in the pattern header information that the weight information is specified with 8-bits precision. Furthermore, it is implicit from the specification of the target pattern that the size of the pattern in the X-direction, and the size of the pattern in the Y-direction both are equal to 3. Furthermore, it is implicit that the atrous factor equals 3.

FIG. 7B schematically shows the pattern specified by this pattern specification.

As in the previous examples, it is presumed that steps S1-S6 of the procedure are completed. Also it is assumed that the processor element controller has assumed the first one of the set of address computation modes as its initial address computation mode.

In operation, the processor element controller fetches the control value STR from the first control subsection (bits 40, 41) of the accessed storage location. The control value STR indicates that the first magnitude subsection (bits 0-7) of the accessed storage location comprises weight information. As the weight information is provided with 8-bit precision, the first magnitude subsection comprises a first weight indicator w000, having a proper weight value. The control value STR indicates that the processor element address is to be stepwise increased in accordance with the current address computation mode, which is the first address computation mode assumed upon initialization. In accordance therewith, the processor element controller updates the processor element with address EA, with the weight value of w000.

The processor element controller retrieves the control value STR from the second control subsection (bits 42, 43) and the magnitude value of w100 from the corresponding second magnitude subsection.

As the depth Z of the pattern equals 2, the magnitude value of w100 corresponds to the processor element having the same x and y coordinate within the footprint of the pattern and being the next one in the Z-direction. The address of this processor element EA+W*H (EA0+W*H), and the processor element controller updates this only processor element having the same x and y coordinate within the footprint of the pattern with the specified magnitude value. The processor element address is then updated according to the current, first address computation mode, so that EA←EA+1 (EA0+1).

The processor element controller retrieves the control value SKP from the third control subsection (bits 44, 45) and the magnitude value (2) from the corresponding third magnitude subsection (bits 8-15). In accordance therewith the processor element controller further updates the address as EA←EA+2 (EA0+3).

The processor element controller then updates the processor elements with addresses EA and EA+W*H (EA0+3, EA0+3+W*H) with the weight values specified by magnitude indicators w001 and w101 in the fourth and the fifth magnitude subsection respectively. Once again, the processor element controller updates the processor element address as EA←EA+1 (EA0+4) and subsequently as EA←EA+2 (EA0+6) as specified by the control value SKP in the first control subsection of the next pattern memory line. The processor element controller then updates the processor elements with addresses EA and EA+W*H (EA0+6, EA0+6+W*H) with the weight values specified by magnitude indicators w002 and w102 in the second and the third magnitude subsection respectively. The corresponding control indicators in the second and the third control section indicate the control value TRN, which causes the processor element controller to select the next address computation mode, which is the second address computation mode. In accordance with the second address computation mode, the processor element address is updated as EA←EA+W (EA0+6+W). In this address computation mode, the control value SKP read from the fourth control subsection, the processor element address is further updated as EA←EA+2*W (EA0+6+3*W). Analogously applying the further control information in the pattern information memory, it can be seen that upon completion, the processor element controller has updated the processor elements EA0 (000), EA0+W*H (100); EA0+3 (001), EA0+W*H+3 (101); EA0+6 (002), EA0+W*H+6 (102); EA0+3*W+6 (012), EA0+3*W+W*H+6 (112); EA0+6*W+6 (022), EA0+6*W+W*H+6 (122); EA0+6*W+3 (021), EA0+6*W+W*H+3 (121); EA0+6*W (020), EA0+6*W+W*H (120); EA0+3*W (010), EA0+3*W+W*H (110), EA0+3*W+3 (011), EA0+3*W+W*H+3 (111), as illustrated by the arrow inside the pattern in FIG. 7B.

In the example shown in FIG. 5B, the header information of a target pattern further comprises an indication SB of a position inside the first one of a subset of the third plurality of addressable storage entries. Therewith pattern information can be stored more compactly in the pattern memory.

In summary, a message based processor system is provided herein with a plurality of message based processor system cores. Cores therein comprise a processor element controller that is configured to receive a message with an indication of a subset processor elements in the core to which it is directed as well as an indication of a target pattern, and to update the state value of the processor elements in the subset in accordance with a specification of the target pattern. The processor element controller is configurable in an address computation mode selected from a cyclic set of address computation modes, and configured to maintain its computation mode or assume a next address computation mode selected from the cyclic set dependent on a control value of a currently applied pattern element. Therewith a target pattern can efficiently specified. Whereas the embodiments described particularly relate to computations in a 3D space, i.e. wherein the processor element address is associated with a first coordinate (x) along a first coordinate axis (X), a second coordinate (y) along a second coordinate axis (Y) and a third coordinate (z) along a third coordinate axis (Z), the invention is equally applicable to higher dimensional spaces associated with further coordinates, such as a time coordinate and/or one or more coordinates for a signal feature, e.g. color.

As already indicated above, exemplary embodiments may be implemented in digital electronic circuitry, or in computer hardware, firmware, software, or in combinations of them.

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers. In an example embodiment, the machine-readable medium may be a non-transitory machine- or computer-readable storage medium.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. A message-based processor system comprising:
   at least one controller to:
   receive an input message comprising a first indication of at least a subset of a plurality of processor elements and a second indication of a target pattern, each of the plurality of processor elements having an addressable storage entry with a processor element address storing a processor element state, and
   update a state value of each of the processor elements in the subset based on magnitude values of respective pattern elements of the target pattern,
   the at least one controller being configurable in an address computation mode selected from a set of address computation modes, and being configured to maintain a current address computation mode of the set of address computation modes or assume a next address computation mode selected from the set of address computation modes based on a currently applied pattern element of the target pattern, and
   the at least one controller being configured to assume an initial address computation mode selected from the set of address computation modes upon receipt of the input message, and to compute the processor element address of a succeeding processor element in the subset relative to a processor element preceding the succeeding processor element in accordance with the current address computation mode.

2. The message-based processor system of claim 1, wherein the magnitude values are of respective succeeding pattern elements of the target pattern.

3. The message-based processor system of claim 1, wherein the target pattern is one of a plurality of target patterns, and additional addressable storage entries specify pattern information of the plurality of target patterns, the pattern information comprising at least the magnitude values for respective pattern elements of each of the plurality of target patterns.

4. The message-based processor system of claim 1, wherein the at least one controller is configured to maintain the current address computation mode or assume the next address computation mode based on a control value of the currently applied pattern element.

5. The message-based processor system of claim 4, wherein the target pattern is one of a plurality of target patterns, and additional addressable storage entries specify pattern information of the plurality of target patterns, the pattern information comprising the magnitude values and control values for respective pattern elements of each of the plurality of target patterns.

6. The message-based processor system according to claim 4, wherein each control value is one of a plurality of possible control values, the plurality of possible control values comprising a first control value indicating that the current address computation mode is to be maintained, and a second control value indicating that the next address computation mode is to be assumed.

7. The message-based processor system according to claim 6, wherein the plurality of possible control values further comprises a third control value indicating that a pattern element is a final one of a set of pattern elements.

8. The message-based processor system of claim 1, wherein the processor element address of each processor element is associated with a plurality of coordinates.

9. The message-based processor system of claim 8, wherein the plurality of coordinates comprises a first coordinate along a first coordinate axis, a second coordinate along a second coordinate axis, and a third coordinate along a third coordinate axis.

10. The message-based processor system of claim 9, wherein the processor element address is related to the plurality of coordinates according to a relationship $EAi=x+W*y+W*H*z$, wherein EAi is the processor element address, x is the first coordinate, y is the second coordinate, z is the third coordinate, W is a linewidth, and H is a number of lines in a plane.

11. The message-based processor system of claim 10, wherein the at least one controller is configured to compute the processor element address of the succeeding processor element by addition of an address step to the processor element address of the processor element preceding the succeeding processor element.

12. The message-based processor system of claim 11, wherein the set of address computation modes is a cyclic set of address computation modes comprising a first address computation mode wherein the address step equals +1, corresponding to a change of the first coordinate in a first direction along the first coordinate axis with a step of 1, a second address computation mode wherein the address step equals +W, corresponding to a change of the second coordinate in a second direction along the second coordinate axis with a step of 1, a third address computation mode wherein the address step equals −1, corresponding to a change of the first coordinate in a direction opposite the first direction along the first coordinate axis with a step of 1, and a fourth address computation mode wherein the address step equals −W, corresponding to a change of the second coordinate in a direction opposite the second direction along the second coordinate axis with a step of 1.

13. The message-based processor system according to claim 9, wherein the at least one controller is further configured to subsequently address each processor element having the same value of the first coordinate and the second coordinate within a range determined by a target pattern size of the target pattern in a direction of the third coordinate axis, before computing the processor element address of a further succeeding processor element by a change of value of the first coordinate or the second coordinate.

14. The message-based processor system of claim 1, comprising a plurality of cores, wherein each core comprises the plurality of processor elements and the at least one controller.

15. The message-based processor system according to claim 1, further comprising one or more additional addressable storage entries to contain header information of the target pattern.

16. The message-based processor system according to claim 15, wherein the header information indicates a target pattern size.

17. The message-based processor system according to claim 15, wherein the header information comprises an indication of a precision with which the magnitude values of the respective pattern elements are stored.

18. A method of operating a message-based processor system, the method comprising:
 receiving an input message comprising a first indication of at least a subset of a plurality of processor elements and a second indication of a target pattern, each of the plurality of processor elements having an addressable storage entry with a processor element address storing a processor element state;
 in response to receiving the input message, assuming an initial address computation mode selected from a set of address computation modes; and
 updating a state value of each of the processor elements in the subset based on magnitude values of respective pattern elements of the target pattern, wherein a currently applied pattern element of the target pattern in each case determines whether to maintain a current address computation mode of the set of address computation modes or assume a next address computation mode selected from the set of address computation modes, and wherein the processor element address of a succeeding processor element in the subset relative to a processor element preceding the succeeding processor element is computed in accordance with the current address computation mode.

19. The method of claim 18, wherein a control value of the currently applied pattern element of the target pattern determines whether to maintain the current address computation mode or assume the next address computation mode.

20. A core for a message-based processing system, the core comprising:
 at least one controller to:
 receive an input message comprising a first indication of at least a subset of a plurality of processor elements and a second indication of a target pattern, each of the plurality of processor elements having an addressable storage entry with a processor element address storing a processor element state, and
 update a state value of each of the processor elements in the subset based on magnitude values of respective pattern elements of the target pattern,
 the at least one controller being configurable in an address computation mode selected from a set of address computation modes, and being configured to maintain a current address computation mode of the set of address computation modes or assume a next address computation mode selected from the set of address computation modes based on a currently applied pattern element of the target pattern, and
 the at least one controller being configured to assume an initial address computation mode selected from the set of address computation modes upon receipt of the input message, and to compute the processor element address of a succeeding processor element in the subset relative to a processor element preceding the succeeding processor element in accordance with the current address computation mode.

* * * * *

UNITED STATES PATENT AND TRADEMARK OFFICE
CERTIFICATE OF CORRECTION

PATENT NO. : 12,288,109 B2  
APPLICATION NO. : 18/603003  
DATED : April 29, 2025  
INVENTOR(S) : Yousefzadeh et al.

Page 1 of 1

It is certified that error appears in the above-identified patent and that said Letters Patent is hereby corrected as shown below:

In the Claims

In Column 18, Line 45, in Claim 10, delete "His" and insert --H is-- therefor

Signed and Sealed this  
Sixteenth Day of September, 2025

Coke Morgan Stewart  
*Acting Director of the United States Patent and Trademark Office*